A. HELBRONNER.
APPARATUS FOR STERILIZING WATER BY MEANS OF ULTRA-VIOLET RAYS.
APPLICATION FILED OCT. 29, 1912.
1,191,304. Patented July 18, 1916.
2 SHEETS—SHEET 1.
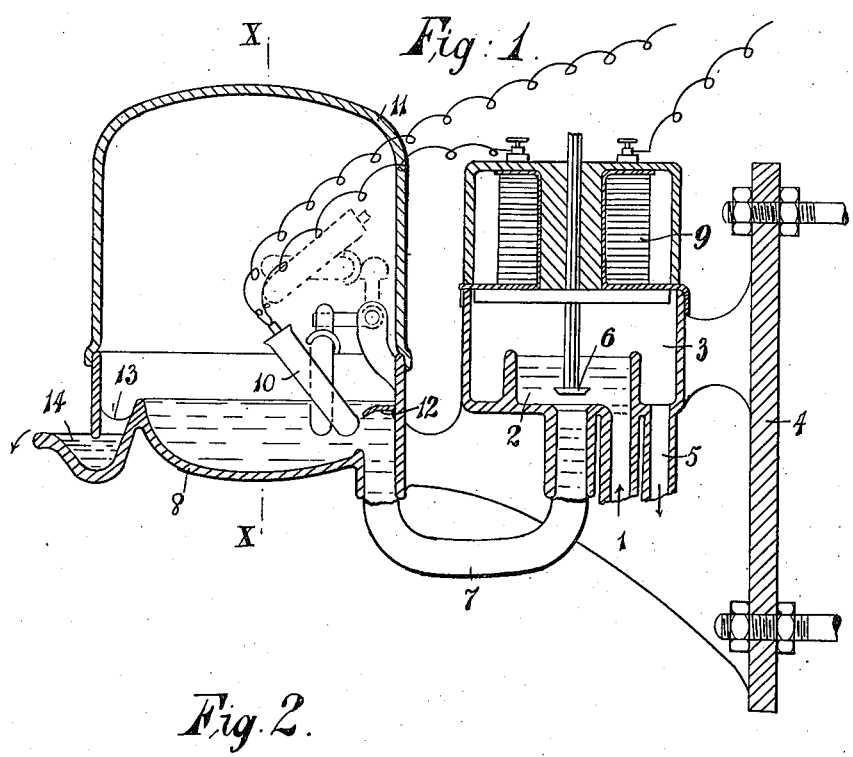
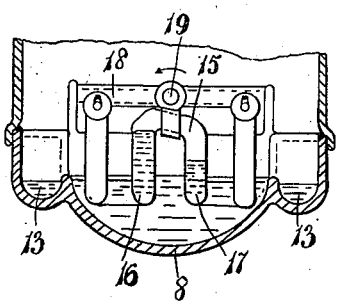
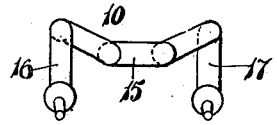
Attest:
Ewd R. Tolson
H. L. Alden
Inventor:
André Helbronner,
by Wm Wallace White
Attys

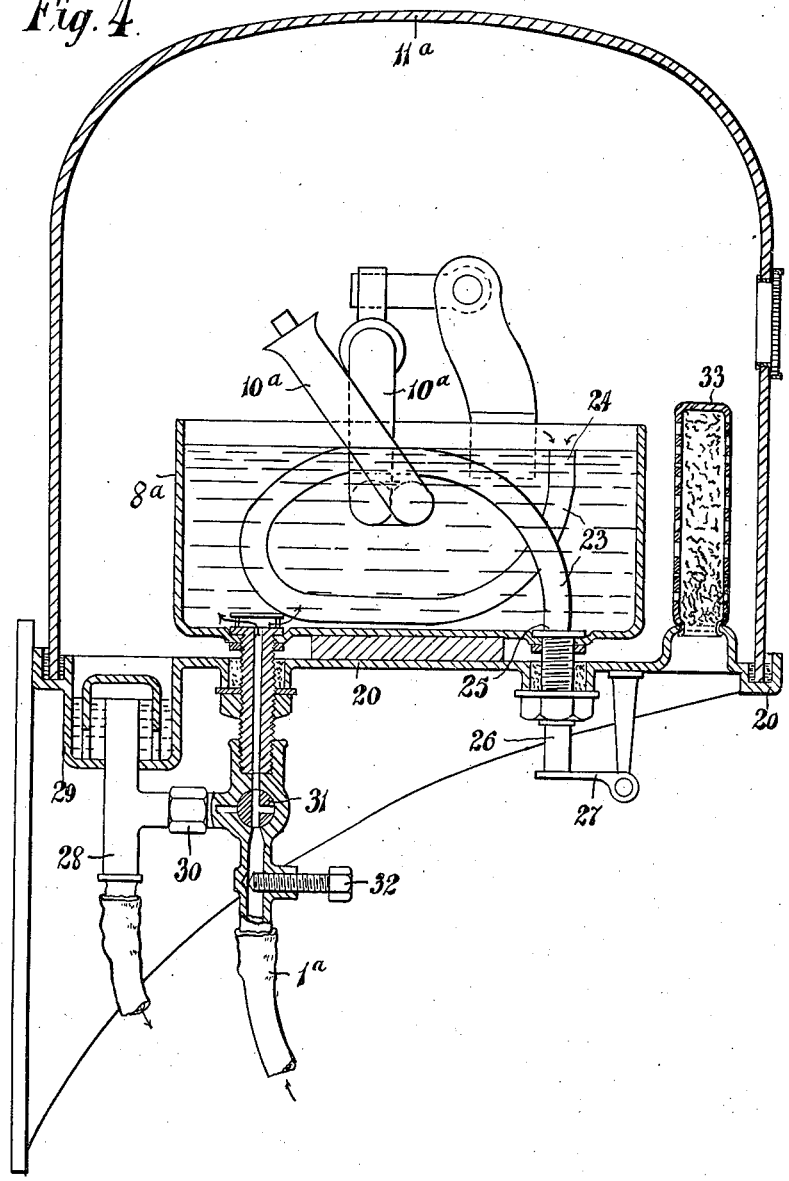

UNITED STATES PATENT OFFICE.

ANDRÉ HELBRONNER, OF PARIS, FRANCE, ASSIGNOR, BY MESNE ASSIGNMENTS, TO THE R. U. V. COMPANY, INC., A CORPORATION OF NEW YORK.

APPARATUS FOR STERILIZING WATER BY MEANS OF ULTRA-VIOLET RAYS.

1,191,304.   Specification of Letters Patent.   Patented July 18, 1916.

Application filed October 29, 1912.   Serial No. 728,439.

*To all whom it may concern:*

Be it known that I, ANDRÉ HELBRONNER, a citizen of the Republic of France, residing at Paris, France, have invented the new and useful Improvement in Apparatus for Sterilizing Water by Means of Ultra-Violet Rays, of which the following is a specification.

The invention has for its object to provide improved apparatus for sterilizing water by means of ultra-violet rays which shall be especially suitable for domestic use.

In the apparatus constructed according to this invention, the water to be sterilized is led into the lower part of a vessel provided with a baffle or deflecting device and thence to an outlet pipe. During its passage through the vessel, the water is exposed to the action of ultra-violet rays, emitted by a mercury lamp the luminous part of which is located above the vessel, the electrodes being preferably immersed in the water.

The elimination of the impurities in suspension in the water is effected by making it overflow the sterilizing vessel or a special reservoir situated above this vessel by which means the surface of the water on which the impurities accumulate will be skimmed off.

In the accompanying drawings, Figure 1, is a vertical section representing an apparatus constructed in accordance with the invention. Fig. 2 is a section on the line X—X of Fig. 1. Fig. 3 is a plan view of the lamp employed in the apparatus. Fig. 4 illustrates a modification of the invention in which the discharge of the sterilized water is effected by means of a tortuous passage permeable to ultra-violet rays.

In the apparatus represented in Figs. 1, 2 and 3, the water is supplied by a conduit 1 to a receiver 2, placed in a chamber 3 supported by a bracket 4 which may be secured to a wall in any suitable manner. The chamber 3 is provided with a waste pipe 5 permitting the water which escapes over the edge of the receiver 2 to flow away. This receiver 2 communicates through a valve 6 with a conduit 7 which opens into the sterilization vessel 8.

The sterilization vessel 8 is preferably made of porcelain and is covered with a bell 11. The water enters the vessel near the bottom thereof and passes a baffle 12 placed above the admission orifice which directs and regulates the current of water. The water which overflows the upper edge or lip of the vessel 8 escapes into a channel 13 and thence into a pocket 14 which forms a water seal and permits a continuous flow of the water. During its passage through the vessel 8, the water is subjected to the action of the ultra-violet rays emitted by the mercury lamp 10. This lamp comprises a luminous tube 15 located outside the water with its two electrodes 16, 17 immersed in the water. By reason of the immersion of these electrodes the cooling surfaces of the latter and especially that of the positive electrode may be dispensed with. It is also unnecessary to contract the negative electrode consequently the construction of the lamp is extremely simple and cheap. This advantage is a very important one.

The lamp 10 is constituted by a simple tube symmetrically bent in a suitable manner. As can be seen in Fig. 2 the negative electrode 16 and the positive electrode 17 are immersed in the water. The luminous portion of the lamp is placed above the liquid. The level of the mercury in the positive electrode 17 is slightly above the level of the water contained in the vessel, while in the negative electrode 16 the mercury extends as far as the bent part of the lamp. The positive electrode being hotter than the negative electrode ought as a matter of fact to be cooled more completely and this is attained by causing its upper level to be nearer to the level of the surrounding water. The same result can be attained by increasing the surface of the positive electrode which is immersed in the water.

The tilting of the lamp for the purpose of starting the same comprises two movements; first a movement of rotation around an axle 18, parallel to the luminous tube of the lamp, in such a manner as to move it from the position shown in dotted lines to that indicated in full lines in Fig. 1 and second, a movement of rotation in the direction of the arrow in Fig. 2 around a pivot 19 perpendicular to the axle 18.

During the tilting movement a part of the mercury of the positive electrode 17 passes through the tube 15 toward the negative electrode 16 then when the lamp is returned to its first position the luminous tube is inclined toward the positive electrode and the excess of mercury returns to this electrode.

The working tension of this lamp can be easily modified by varying the respective heights of the electrodes immersed in the water. This lamp which has a good output in ultra-violet rays is of an eminently simple construction and may, furthermore, be employed in a large number of apparatus other than the one described.

The operation of the apparatus is as follows: When the lamp is working the valve 6 being open the water arriving by the pipe 1 is led into the pipe 7 and thence to the vessel 8 where it is submitted to the sterilizing action of the ultra-violet rays emitted by the lamp 10. The water from the sterilization vessel 8 escapes regularly over its edge or lip into the channel 13 and from this, into the pocket 14 whence it is discharged in the form of a parabolic jet. If the flow of water through the pipe 1 is too great, some of the water escapes above the edge or lip of the vessel 2 and passes away by the conduit 5. If the operation of the lamp is interrupted, the valve 6 which is normally maintained raised by the electromagnet 9, returns to its seat and the water ceases to be admitted into the vessel 8.

Referring now to the Fig. 4, the arrangement therein shown is applied particularly to the case where the water has solid matter in suspension For this purpose, the water which is supplied to the sterilization vessel escapes to the outlet pipe through a tortuous path or tube formed of a material permeable to ultra-violet rays. The ultra-violet rays are furnished by a mercury vapor lamp similar to the one described in reference to Figs. 1, 2, 3 and whose two electrodes are immersed in the liquid.

The tortuous path through which the water must pass during its exposure under the lamp is, for example constituted by one or several worms 23, having one or more convolutions and made of a material transparent to the ultra-violet rays, such as quartz. The worm or worms, is or are immersed in a vessel 8ª, the open extremity 24 being located near the upper part of this vessel. The opposite extremity 25 of the worm 23 is connected with an escape pipe 26 closed by a valve operated by a lever 27. The water supply pipe opens into the bottom of the vessel 8ª. Finally a waste pipe 28 opening into a small chamber 29 permits the water to be run off when desired.

The pipe 28 is connected to the pipe 1ª by a branch 30 provided with a three way cock 31 by which the pipe 1ª can either be closed or caused to communicate with the vessel 8ª, or put in direct communication with the waste pipe 28. A valve 32 regulates the flow of water through the entrance pipe 9. The whole of the apparatus is covered by a bell 11ª of any suitable material connected to the plate 20 by an appropriate hydraulic or other joint, 33, is a filter purifying the air which passes into the apparatus.

In order to start the apparatus the lamp is lighted and the cock 31 is turned to the position indicated in the drawing. The water enters into the worm 23 and is exposed to the ultra-violet rays emitted by the lamp 10ª. The water is discharged, the valve operated, by lever 27 being open.

When the cock 31 is shut, the passage of sterilized water ceases but the vessel 8ª remains full up to the level of the opening 24 of the worm 23. The worm 23 therefore, always remains immersed which prevents it from being heated and renders impossible any deposit on its surface which therefore maintains its transparency to the ultra-violet rays which is necessary to obtain good and permanent operation. Furthermore, the sterilized water does not undergo any rise of temperature. The impurities in suspension in the water generally rise to the surface in the vessel 8ª, which vessel is cleaned by opening the cock 31 to permit water to flow into the vessel 8ª, and closing the valve in pipe 26, the water rises in the vessel 8ª until it overflows the edge, and the impurities which are found on the surface thereby, flow to the outside of the vessel and are then carried off by 28.

Finally the cock 31 can be turned in such a manner as to interrupt the communication between the vessel 8ª and the water supply and to connect on the contrary the vessel 8ª and the waste pipe 28. In this position the vessel 8ª and the worm can be completely emptied which is a very useful precaution in frosty weather for example.

In place of the worm, any other arrangement can be provided which causes the water to follow a sufficiently tortuous path and to remain sufficiently long under the influence of the ultra-violet rays. For example, it will be readily understood that by an arrangement opposite of that shown in the drawings, the water supply pipe may open direct into the entrance of the worm which is located at the bottom of the vessel. The discharge of the water would be effected at the surface where, when full to overflowing, the sterilized water could be caught and conducted to the outlet valve. The only condition to be observed is that the devices whatever they may be by which this tortuous path is obtained should always be immersed in such a manner that there may be no incrustation or deposit of any solid or opaque material which would necessitate a difficult cleaning operation. Another characteristic of the apparatus consists in the arrangement which permits after an interruption, of taking away the surface water on which are accumulated all the impurities in suspension.

What I claim is:

1. In an apparatus for sterilizing water, the combination of an open vessel adapted to contain the water to be sterilized and to have the water overflow its edges, a mercury vapor lamp arranged with its luminous portion above the edges of the vessel and with its electrodes depending within the vessel to be immersed in the water, an inlet pipe connected with the vessel for supplying water to the same, and means arranged within the vessel above the inlet pipe for deflecting the incoming water toward the bottom of the vessel.

2. In apparatus for sterilizing water, the combination of an open vessel in which the water is sterilized, a source of ultra-violet rays in proximity to the surface of the water therein, an inlet pipe opening to the bottom of the vessel, a tubular worm of material permeable to ultra-violet rays located in said vessel with an open end at the level of the water therein and its other end connected to the outlet pipe.

3. In apparatus for sterilizing water, the combination of an open vessel in which the water is sterilized, a source of ultra-violet rays in proximity to the surface of the water therein, a chamber inclosing the sterilizing vessel, an outlet pipe connected to said chamber, a water supply pipe and a pipe connected to the sterilizing vessel and through a three-way cock to the outlet pipe and to the water supply pipe.

4. In apparatus for sterilizing water, the combination of an open vessel, in which the water is sterilized, a source of ultra-violet rays in proximity to the surface of the water therein, a chamber inclosing the sterilizing vessel, an inlet pipe for supplying water to the sterilizing vessel, an outlet pipe for discharging water therefrom and an outlet pipe for discharging water from the interior of said inclosing chamber.

In testimony whereof I have hereunto subscribed my name this sixteenth day of October 1912.

ANDRÉ HELBRONNER.

Witnesses:
MAX VON REIKEZTAU,
LUCIEN MEMMINGER.